United States Patent [19]

Adachi et al.

[11] Patent Number: 4,505,966
[45] Date of Patent: Mar. 19, 1985

[54] MAGNETIC RECORDING MEDIUM

[75] Inventors: Tomio Adachi, Sagamihara; Shigeru Shiozaki, Machida; Takashi Tomie, Hino, all of Japan

[73] Assignee: Teijin Limited, Osaka, Japan

[21] Appl. No.: 570,435

[22] Filed: Jan. 16, 1984

Related U.S. Application Data

[63] Continuation of Ser. No. 362,113, Mar. 26, 1982, abandoned.

[30] Foreign Application Priority Data

Mar. 30, 1981 [JP] Japan .................................. 56-45393
Mar. 31, 1981 [JP] Japan .................................. 56-46348
May 8, 1981 [JP] Japan .................................. 56-68105

[51] Int. Cl.$^3$ .............................................. B05D 3/04
[52] U.S. Cl. ........................................ 428/141; 428/172; 428/336; 428/900; 428/694; 428/695; 427/132; 204/192 M; 204/192 N; 264/210.6; 264/235.6
[58] Field of Search .............. 427/128, 129, 130, 132; 428/694, 141, 695, 172, 900, 336; 204/192 M, 192 N; 264/210.6, 235.6

[56] References Cited

U.S. PATENT DOCUMENTS

| | | | |
|---|---|---|---|
| 3,983,285 | 9/1976 | Riboulet et al. | 428/212 |
| 3,993,824 | 11/1976 | Shirahata et al. | 428/900 |
| 4,138,386 | 2/1979 | Motegi et al. | 260/40 R |
| 4,153,920 | 5/1979 | Shirahata et al. | 428/900 |
| 4,233,352 | 11/1980 | Ono et al. | 428/141 |
| 4,304,807 | 12/1981 | Kawakami et al. | 428/148 |

*Primary Examiner*—Norman Morgenstern
*Assistant Examiner*—Ken Jaconetty
*Attorney, Agent, or Firm*—Sherman & Shalloway

[57] ABSTRACT

A magnetic recording medium composed of an oriented polyethylene terephthalate film as a support layer and a thin magnetic metallic layer formed on one surface (A) of the support layer and optionally a lubricant layer formed on the other surface (B) of the support layer; characterized in that (1) the surface A has a center-line average (CLA) of not more than 0.005 $\mu$m,
(2) the surface A has a peak-to-valley (PV) value of not more than 0.06 $\mu$m,
(3) the number of protrusions having a height of 0.27 to 0.54 $\mu$m on the surface A is at most 0.2 per mm$^2$, and
(4) the surface A is substantially free from protrusions having a height larger than 0.54 $\mu$m.

4 Claims, No Drawings

MAGNETIC RECORDING MEDIUM

This application is a continuation of application Ser. No. 362,113, filed Mar. 26, 1982, now abandoned.

This invention relates to a high-density magnetic recording medium, and more specifically, to a magnetic recording medium having a thin magnetic recording layer, which has a low noise level and a high signal-to-noise ratio in data reading and particularly shows a low noise level during playback in high-density recording.

Ordinary recording media in magnetic recording now in use are composed of a suitable substrate, for example a flexible polymeric film (a polyester film, etc.) having several microns to several tens of microns in thickness, and formed on its surface, a magnetic recording layer, several microns to several tens of microns in thickness, of a dispersion of a ferromagnetic powder such as $\gamma$-$Fe_2O_3$, Co-doped $\gamma$-$Fe_2O_3$, $CrO_2$ or Fe dispersed in an organic binder.

As one improvement in the magnetic recording technique, it is desired to increase the density of recording for each predetermined area. The limit of the recording density in magnetic memory elements used in recording devices such as discs, drums and tapes is determined by the ratio of the demagnetizing field to coersive force. The strength of the demagnetizing field has to do with the saturation magnetization and thickness of a recording medium. In order to achieve a tolerable level of the signal-to-noise ratio, it is necessary to obtain a thin recording layer capable of producing a sufficient output signal. Such a level is easier to achieve as the squareness ratio and the saturation magnetic flux density of the B-H curve of the recording medium become higher.

It is an object of this invention therefore to provide a magnetic recording medium including a thin recording layer having a high coercive force, a high residual magnetic moment and a hysteresis loop with a good squareness ratio or a magnetic recording medium having a thin metallic recording layer which has a low noise level and a high signal-to-noise ratio during data reading and particularly shows a low noise level during playback in high-density recording.

Recently, there have been proposed high-density magnetic recording media produced by forming a thin metallic layer as a magnetic recording layer on a non-magnetic support by a vacuum depositing or plating method such as vacuum evaporation or sputtering without using a binder. For example, a cobalt-deposited tape is disclosed in Japanese Laid-Open Patent Publication No. 147010/1979, and a perpendicularly magnetized film composed of Co-Cr alloy is disclosed in Japanese Laid-Open Patent Publication No. 134706/1977. Metallic films formed by such film-forming means as vacuum evaporation, sputtering or ion plating have a thickness of not more than 1.5 microns and exhibit performances equivalent to those of conventional coated recording media having a magnetic layer thickness of more than 3 microns.

It is thought that magnetic properties such as a coercive force $H_c$ and the squareness ratio of a hysteresis loop do not appreciably depend on the surface condition of the non-magnetic support used. As an embodiment of this thought, U.S. Pat. No. 3,787,327 discloses a multilayer structure of Co-Cr obtained by vacuum evaporation. This structure, however, has the defect that since it has a thin metallic film, the surface condition (surface unevenness) of the non-magnetic support appears directly as the unevenness of the magnetic film and the unevenness becomes the cause of noises.

From the viewpoint of noises, the surface of the non-magnetic support is desirably as smooth as possible. But if the surface of the film is too smooth, its slippability will be reduced and a blocking phenomenon will occur. Hence, in view of the handling of the film such as winding or unwinding, the surface of the base film should be slightly rough. Thus, the surface of a support is required to be smooth from the viewpoint of electromagnetic converting characteristics and be rough from the standpoint of the handling and running characteristics of the resulting recording medium.

It is another object of this invention therefore to provide a magnetic recording medium comprising a non-magnetic support, which simultaneously has these two inconsistent properties.

We have now found that the aforesaid objects of this invention can be achieved by using as a non-magnetic support (support layer) an oriented polyethylene terephthalate film, that surface (to be referred to as a surface A) of the film on which to form a thin magnetic metal layer meeting the following requirements (1) to (4).

(1) The surface A should have a center-line average (CLA) of not more than 0.005 $\mu$m, preferably not more than 0.004 $\mu$m;

(2) the surface A should have a peak-to-valley (PV) value of not more than 0.06 $\mu$m;

(3) the number of protrusions on the surface A which have a height of 0.27 to 0.54 $\mu$m should be at most 0.2 per $mm^2$; and (4) the surface A should be substantially free from protrusions having a height of more than 0.54 $\mu$m, preferably more than 0.27 $\mu$m.

Thus, according to this invention, there is provided a magnetic recording medium comprising [i] an oriented polyethylene terephthalate film, as a support layer, having a surface A meeting the aforesaid requirements (1) to (4) and [ii] a thin magnetic metal layer formed on the surface A of the film, and [iii] optionally a lubricant layer formed on that surface (to be referred to as a surface B) of the film support which is opposite to the surface A.

The requirements (1) to (4) are measured and determined by the following methods.

(1) Center-line average (CLA)

This is one measure of surface roughness and is determined in accordance with the method of JIS B 0601 by means of a needle pointer-type surface roughness tester (SURFCOM 3B, an instrument made by Tokyo Seimitsusha Co., Ltd.). The tester is allowed to draw a chart of a film surface roughness curve under a load of 0.07 g with a needle tip radius of 2 $\mu$m. A portion having a measured length L (0.25 mm) is removed in the direction of the center line of the curve. The roughness curve is expressed by Y=f(X) wherein the X axis is the center line of the removed portion and the Y axis is in a direction perpendicular to the X axis, $R_{CLA}$ ($\mu$m) is calculated from the following equation.

$$\text{Let } \bar{f} \text{ be } \bar{f} = \frac{1}{L_o} \int^L f(x)dx,$$

$$\text{Then, } R_{CLA} = \frac{1}{L_o} \int^L |f(x) - \bar{f}|dx$$

The measurement is made by using 8 samples. The three largest measured values are excluded, and the average of the five measured values is calculated and defined as CLA.

(2) Peak-to-valley (PV) value

The PV value is another measure of surface roughness, and measured by the following method.

A surface-roughened film is measured by the aforesaid needle point-type surface roughness tester, and its film roughness curve is determined under a load of 0.19 g using a needle with a radius of 2 μm and recorded on a chart with a magnification of 50 times along the base line on the film and 50,000 times perpendicularly to the plane of the film. From the profile roughness curve obtained by this measurement, a portion corresponding to a measured length of the film (standard length 26 mm) is sampled. In this portion of the profile roughness curve, the largest distance between a peak and an adjacent valley is measured. The measured distance is divided by the magnification in a direction perpendicular to the plane of the film (i.e., 50000) and the quotient is expressed in microns. The average of 10 replicates measured and calculated in the same manner as above is defined as the PV value.

(3) and (4) Number of protrusions

Aluminum is uniformly deposited on the surface of a sample film by vacuum evaporation to a thickness of 400 to 500 Å. Collodion is bonded to the other surface of the film, and dried. By using a microscope of the visible monochromatic multiple interference reflecting type (Model JENA 386242 made by Carl Zeiss JENA Company), 100 arbitrarily selected sites of the film are photographed on a scale of 100X. The number of protrusions in the photographs having a height of 0.27 to 0.54 μm (to be referred to hereinafter as the number of 0.27-0.54 μm protrusions) and the number of protrusions having a height larger than 0.54 μm (to be referred to as the number of >0.54 μm protrusions) are counted. These numbers are converted to values per mm$^2$. The field of vision of one photograph is 0.155 mm$^2$.

The "polyethylene terephthalate", as used in this invention denotes not only polyethylene terephthalate homopolymer, but also polyethylene terephthalate copolymers composed of at least 85% of ethylene terephthalate recurring units and the remainder being units derived from another acid or glycol component.

All conventional known methods for forming thin magnetic films can be used in this invention. Preferred techniques are vacuum evaporation, ion plating, sputtering and electroless plating.

According to the vacuum evaporation method, a metal in a tungsten boat or an aluminous hearth is evaporated under a vacuum of $10^{-4}$ to $10^{-6}$ torr by resistance heating, high-frequency heating, electron beam heating, etc. to deposit the vapor of the metal onto the support. Fe, Ni, Co and alloys of these are usually employed as the metal. The present invention can also use a reactive evaporating method which involves evaporating Fe in an oxygen atmosphere to obtain an iron oxide film. The ion plating method comprises producing a DC glow discharge or an Rf glow discharge in an atmosphere composed mainly of an inert gas under $10^{-4}$ to $10^{-3}$ torr, thereby to evaporate the metal in the discharge. Usually, Ar is used as the inert gas. According to the sputtering method, a glow discharge is produced in an atmosphere composed mainly of Ar under $10^{-3}$ to $10^{-1}$ torr, and atoms are ejected from the surface of a target by the impact of the resulting Ar ions. Glow discharge may be produced by a DC double-pole or triple-pole sputtering method and a high-frequency sputtering method. A magnetron sputtering method utilizing magnetron discharging can also be used. The electroless plating method gives a Co-P or Co-Ni-P plated layer.

The thickness of the thin magnetic film should be sufficient to produce an output signal as a high-density magnetic recording medium. Thus, although some variations exist depending upon the method of forming the magnetic film or its use, the thin magnetic film preferably has a thickness in the range of generally 0.02 to 1.5 μm (200 to 15000 Å).

Thin magnetic films for longitudinal recording in audio and video devices, computers, etc. may be formed by evaporation (heat evaporation, electron beam evaporation, etc.) sputtering (double-pole DC sputtering, high-frequency sputtering, etc.), etc. In the evaporation process, a ferro-magnetic metal such as Co is deposited obliquely in a continuous manner on a non-magnetic oriented polyethylene terephthalate support so that the axis of easy magnetization is developed in the horizontal direction of the tape, and this process is repeated. By this process, crystal magnetic anisotropy and shape can be developed in the horizontal direction of the tape. Accordingly, the total thickness of the thin metallic layer is preferably about 0.02 to about 0.5 μm (200 to 5000 Å). In the formation of a thin magnetic film for PCM or flexible discs capable of performing high-density digital recording, the generated demagnetizing field can be inhibited by including a suitable amount (10 to 20%) of Cr in Co and thus the axis of easy magnetization can be developed in the perpendicular direction of the non-magnetic oriented polyethylene terephthalate.

Usually, a Co-Cr alloy having a thickness of 0.2 to 1.5μ is used in the sputtering method. In this case, a thin film of a magnetic flux converging material composed of a material having a high magnetic permeability, such as permalloy (Fe-Ni) or a superalloy may be disposed between the non-magnetic oriented polyethylene terephthalate support and the magnetic recording layer having an axis of easy magnetization in the perpendicular direction. The material having a high magnetic permeability as a magnetic flux converging material is formed by sputtering. It is a thin film layer having a thickness of 0.1 to 1 μm (1000 to 10000 Å) and a low coercive force (not more than 50 oersteds). At this time, the magnetic recording layer is preferably formed in a Co-Cr film thickness of 0.2 to 1.5 μm (2000 to 15000 Å).

The thin metallic film formed by such evaporation or sputtering has a small thickness which is 1.5 μm at the largest, and the surface condition of the non-magnetic oriented polyethylene terephthalate support directly appears as the unevenness of the magnetic film, thus causing noises. From the standpoint of noises, therefore the non-magnetic oriented polyethylene terephthalate support preferably has a smooth surface A. A magnetic recording medium having a thin metallic recording layer on a polyethylene film support meeting the surface property requirements (1) to (4) has a drastically reduced noise level. This effect is especially outstanding when the support surface has a CLA of not more than 0.004 μm. There is no particular lower limit to CLA, but usually it is about 0.003 μm.

In order to obtain a film having the above-defined surface properties, there can be employed a method which comprises preparing a film from a polymer containing an inert inorganic compound or an insoluble catalyst residue, or a method which comprises subjecting a film ordinarily prepared to a mechanical or chemical surface roughening treatment. A polyethylene terephthalate film having an optically flat surface as described hereinafter is the most preferred support for use in this invention.

The inert inorganic compound includes substances which are insoluble in, and inert to, thermoplastic resins. Examples include MgO, ZnO, $MgCO_3$, $CaCO_3$, $CaSO_4$, $BaSO_4$, $Al_2O_3$, $SiO_2$, $TiO_2$, kaolin, pottery stone, diatomaceous earth, aluminosilicates and the hydrates thereof, calcium terephthalate, carbon black, and calcium phosphate.

The desired surface properties can be obtained by properly combining the particle size and amount of the inert compound to be added, and the film-forming conditions. The desired particle size can be obtained by various methods which can be practiced by those skilled in the art including the pulverizing and mixing of additives. For example, in the case of calcium carbonate, a slurry of it in ethylene glycol is classified by a classifying device (P-660 Super Decanter, made by Tomoe Kogyo Co., Ltd.). In the case of calcium terephthalate, it is formed into agglomerated particles of a suitable size by applying loads such as shearing, compression and impact, and then classified. In the case of calcium phosphate, an aqueous slurry of calcium phosphate is prepared, and the dispersed calcium phosphate is pulverized in a sand mill. The particle size of the calcium phosphate in the slurry can be reduced to the desired value by repeating the pulverizing operation a suitable number of times.

The amount of the inert inorganic compound depends upon the its particle size distribution and cannot be generalized. Usually, however, the suitable amount is from 0.01 to 1% by weight.

The preferred range of the particle size distribution of the inert inorganic compound is as follows:

| Particle size (d, μm) | Proportion (%) |
| --- | --- |
| d > 1.5 | 0 |
| 1.5 ≧ d > 0.5 | 0–5 |
| 0.5 ≧ d > 0.2 | 20–50 |
| 0.2 ≧ d | 45–80 |

The ratio of the particle sizes of the inert inorganic compound can be calculated as follows:

By using the Stokes' equation, the sedimentation times corresponding to various particle sizes are calculated, and the ranges of the sedimentation times corresponding to the respective particle size ranges are determined.

$$T = \frac{18\eta h}{G(\rho_p - \rho_o) \times d^2}$$

T: the sedimentation time (sec.)
$\eta$: the viscosity of a medium (g/cm.sec=poises)
h: the sedimentation distance (cm)
G: the acceleration of gravity (980 cm/sec$^2$)
$\rho_p$: the density of the inert inorganic compound (g/cm$^3$)
$\rho_o$: the density of the medium (g/cm$^3$)
d: the particle diameter of the inert inorganic compound (cm)

Then, by using a centrifugal sedimentation-type particle size distribution device (CP-50 made by Shimadzu Seisakusho Co. Ltd.), the weight of the sedimented inert inorganic compound within the range of the precipitation time, and the percentage of the measured weight based on its total weight is calculated.

The insoluble catalyst residue can be formed in the polyester by combining suitable amounts of an ester-interchange catalyst and a stabilizer. A film from a polyester containing a controlled amount of the insoluble catalyst residue has formed on its surface a controlled amount of raisings and depressions.

A polyethylene terephthalate film having an optically flat surface is prepared, for example, as follows:

The starting polyethylene terephthalate resin is obtained by subjecting a lower alkyl ester of a dicarboxylic acid comprising terephthalic acid as a main component and a glycol comprising ethylene glycol as a main component to an ester-interchange reaction using a compound of at least one metal selected from Mn, Zn, Ca and Mg as a catalyst and a glycol solution containing a specified phosphorus compound as a stabilizer, and polycondensing the resulting product. The glycol solution described above is a solution of the phosphorus compound obtained by heat-treating a tri(lower alkyl) phosphate in ethylene glycol. This solution should satisfy the amount of potassium hydroxide expressed by the following formula, which is required until the pH of the solution reaches 9.5 when it is titrated with potassium hydroxide.

$$0.53 \leq \frac{[P]}{[KOH]} \leq 0.71 \quad (I)$$

wherein [P] is the amount (moles) of phosphorus in the glycol solution titrated, and [KOH] is the amount (moles) of potassium hydroxide required to the titration.

When the heating temperature used in the preparation of the stabilizer falls outside the range of 130° to 180° C., there is a tendency toward the formation of many protrusions derived from the catalyst residue in the resulting oriented polyethylene terephthalate film. Then, the resulting polyethylene terephthalate resin, either as such or after including a suitable amount of the inert inorganic compound having a controlled particle size distribution, is melt extruded at a resin temperature of 260° to 320° C. for a residence time of 2 to 20 minutes in the extruder to form an unstretched film having an intrinsic viscosity [$\eta$] of 0.35 to 1.0. The film is then stretched to 2.5 to 5.0 times its original dimension in the longitudinal or transverse direction at a temperature above the second order transition point (referred to as Tg) of the polyethylene terephthalate to a temperature 70° C. higher than Tg, and further stretched at a stretch ratio of 2.5 to 5.0 in a direction at right angles to the first stretching direction (e.g., in the transverse direction when the first stretching is in the longitudinal direction) at a temperature from Tg to (Tg+70° C.). (The stretching may be successive biaxial stretching or simultaneous biaxial stretching, and there is no particular restriction in this regard). If desired, the stretched film may further be stretched longitudinally or transversely to a total stretch ratio of about 2.5 to about 6.0. The biaxially oriented polyethylene terephthalate film is then heat-set for 1 to 100 seconds at a temperature usually in the range of from (Tg+70° C.) to the melting point of the polyester.

Compounds containing Mn, Zn, Ca or Mg used as the ester-interchange catalyst may be any compounds which have an ester-interchanging ability. Especially preferred catalysts are organic acid salts formed between acetic acid, propionic acid, salicylic acid or benzoic acid and any one of Mn, Zn, Ca or Mg. The suitable amount of the catalyst compound used is 0.005 to 0.05 mole% based on the dialkyl ester of a difunctional carboxylic acid used as a starting material for polyethylene terephthalate. The time of adding the catalyst compound containing Mn, Zn, Ca or Mg may be any point of time before the completion of the ester-interchange reaction. Usually, it is added before or immediately after the beginning of the reaction.

The glycol solution containing a phosphorus compound as a stabilizer, i.e. the reaction product obtained by heat-treating the tri(lower alkyl)phosphate in ethylene glycol, may be added at any time, preferably after the ester-interchange reaction has been substantially completed. Examples of the tri(lower alkyl)phosphate are trimethyl phosphate, triethyl phosphate and tri-n-butyl phosphate.

The oriented polyethylene terephthalate film obtained after a series of steps of ester-interchange, polycondensation, film formation, stretching and heat-setting is almost free of protrusions on its surface. Even if such protrusions do occur, they are very fine, and the surface is substantially smooth, meeting the requirements (1) to (4) described hereinbefore.

The surface B of the oriented polyethylene terephthalate film used as a support in this invention is free from the restrictions imposed on the surface A. It is preferred however to provide a lubricant layer on the surface B in order to improve the slippability of the film over itself and prevent a blocking phenomenon. Such a lubricant layer may be formed by methods known per se. For example, it can be formed by coating an aqueous or solvent solution containing a lubricant, a polymeric binder and a surface active agent and optionally, an ultraviolet absorber, an antistatic agent, etc. during or after the film formation, and then drying the coated film. Examples of the lubricant are organic lubricants such as sorbitan, organic polymeric lubricants such as Teflon ® or polyethylene, and inorganic lubricants such as alumina, kaolin, silica and molybdenum sulfide. Examples of the polymeric binder include copolymerized polyethylene terephthalates, polyurethan, nylons and melamine resins. A lubricant layer formed by coating the surface B with a reactive aqueous composition composed of a metal acrylate, polyethylene glycol, and polyethylene glycol diglycidyl ether is especially preferred because it has fine mountain-like raised and depressed portions, i.e. fine creases, and exhibits excellent runnability and abrasion resistance.

In one embodiment of this invention, the oriented polyethylene terephthalate film as a support is produced by laminating a film providing the surface A and a film providing the surface B by a co-extrusion method, and biaxially stretching the resulting laminated film either successively or simultaneously. The biaxially stretched laminated film has a total thickness of 3 to 100 μm, preferably 5 to 50 μm, although its thickness may vary depending upon the intended use. There is no particular restriction on the proportion of the thickness of the film providing the surface A based on the total thickness of the laminated film, but it may be between 50 to 90%.

In another preferred embodiment of this invention, care is taken to minimize the dust content of the atmosphere to which the polyethylene terephthalate film is exposed in the step of forming an oriented polyethylene terephthalate film support and processing steps such as slitting. Preferably, the atmosphere should be rated as class 10,000, especially class 100, according to the clean room scale. The "clean room scale" is in accordance with U.S. Standards 209b. The number showing a class indicates the number of fine particles having a diameter of at least 0.5 μm contained per cubic foot of air. For example, class 100 means that the number of fine particles is not more than 100 per cubic foot of air. Likewise, class 10,000 means that the number of such fine particles is not more than 10,000.

Even when the atmosphere has such a clean room scale, dust in the air may be attracted to the film surface by static charge generated during winding, or cut dusts of the film during slitting may adhere to the surface of the film, causing the occurrence of dropouts in the resulting magnetic recording material. It is desirable therefore to prevent the adhesion of dusts by eliminating the charge built up on the film surface in the film-forming and processing steps. It is sometimes necessary to remove the adhering dust by charge-eliminating or vacuum sucking means. Thus, in the film-forming and slitting steps, it is preferred to perform a cleaning treatment of the film surface (by removal of an electric charge, blowing of clean air, or the sucking of the air from the film surface) in addition to using a clean room.

The manufacturing atmosphere can be maintained at class 10,000, preferably class 100, on the clean room scale by removing dust or fine particles from the air by a high-performance filter, and controlling the temperature and air current distributions. In order to prevent adhesion of dust while eliminating an electric charge from the film, the film may be subjected to an ordinary charge-eliminating procedure, for example, by blowing of ionized air. To remove the adhering dust, there may be used (a) a method comprising removing the dust adhering to the film surface by a suction blower while eliminating a static charge, or (b) a method comprising applying a high-speed air to one surface of the film and vacuum suction to the other while eliminating an electric charge. According to the method (b), the air ionized by ultrasonic waves is applied to the surface of the film to destroy an unstable air layer on the film surface and separate the adhering fine particles completely from the air film or from a zone to which the dust is adhering by moisture, and the separated fine particles are sucked by a vacuum chamber located nearby. Needless to say, the air to be blown must be rated as class 10,000 or 100 on the clean room scale.

The following examples illustrate the present invention specifically. It should be understood that the invention is not limited to the specific embodiments shown in these examples.

EXAMPLES 1 TO 4 AND COMPARATIVE EXAMPLES 1 TO 3

In Examples 1 to 4, 100 parts of dimethyl terephthalate and 70 parts of ethylene glycol were subjected to an ester-interchange reaction in the presence of 0.023 part (0.020% based on dimethyl terephthalate) as a catalyst at 150° to 240° C. for 4 hours while distilling off methanol.

Each of the stabilizers prepared by the methods shown in Table 1 (glycol solutions of phosphorus compounds) was cooled to room temperature, and 0.014 part of the stabilizer calculated as trimethyl phosphate was added. As a polycondensation catalyst, 0.04 part of antimony trioxide was added, and a predetermined amount (see Table 1; in Examples 1 to 3, the catalyst was not added) of each of inert inorganic compounds having the particle size distributions shown in Table 1 was added. The ester-interchange reaction product was thus polycondensed under a high vacuum of not more than 1 mmHg for 4 hours to give polyethylene terephthalate having an intrinsic viscosity [η], measured at 25° C. in an o-chlorophenol solution of the polymer, of 0.65.

In Comparative Examples 1 to 3, the ester-interchange reaction was performed by using 40 millimole % of zinc acetate, 20 millimole % of antimony trioxide and 40 millimole % of phosphorous acid, based on dimethyl terephthalate, as a catalyst, and a predetermined amount (see Table 1; in Comparative Example 1, it was not added) of each of inert inorganic compounds having the particle size distributions indicated in Table 1 was added, and the ester-interchange reaction product was polycondensed to give polyethylene terephthalate having an [η] of 0.65.

Each of the polyethylene terephthalates obtained in Examples 1 to 4 and Comparative Examples 1 to 3 was dried at 160° C., melt-extruded at 290° C., and quenched and solidified on a casting drum held at 40° C. to give an unstretched film having a thickness of 130 μm.

The unstretched film was successively stretched longitudinally at 90° C. and a stretch ratio of 3.5 and then transversely at 120° C. and a stretch ratio of 3.8. One surface of the resulting film was coated with a 1% by weight aqueous solution of a composition consisting of 45% by weight of modified polysiloxane, 40% by weight of aminosilane, 5% by weight of $MoS_2$ and 10% by weight of a surface-active agent, and heat-set at 205° C. for 10 seconds to give a film having a thickness of 10 μm and containing a lubricant layer.

The resulting films had good slippability and could be wound up in good condition without blocking.

On the uncoated surface of the resulting film, (1) an Mo-permalloy layer having a low coercive force was formed, and then (2), a perpendicularly magnetized layer of Co-Cr was formed on the permalloy layer by the following procedures.

(1) Mo-permalloy layer having a low coercive force

Using an Mo-permalloy target (Ni 78%, Fe 18% and Mo 4%) having a thickness of 1 mm, a film having a thickness of 0.3 μm was prepared at a deposition speed of 500 Å/min. in Ar (99.99%) under $1 \times 10^{-2}$ torr by a DC magnetron sputtering technique. The resulting film had an in-plane coercive force of about 2 oersteds.

(2) Co-Cr vertical perpendicularly magnetized film layer

A Co-Cr alloy film having a thickness of 1.0 μm was formed at a deposition speed of 500 Å/min. in Ar (99.99%) under $1 \times 10^{-2}$ torr by a DC magnetron sputtering technique using a Co-Cr alloy target (Cr 17% by weight) having a thickness of 4 mm. The dispersion angle ($\Delta\Theta_{50}$: the half-value width of the rocking curve) of the C axis of a hexagonal most closely packed crystal lattice determined from the X-ray rocking curve of the resulting perpendicularly magnetized film was 5° to 6°. The film had a coercive force in the perpendicular direction, determined from the magnetic B-H curve, of 610 to 660 oersteds and an in-plane coercive force of 200 to 250 oersteds. The saturation magnetization was about 450 emu/cc.

The resulting recording media having a layer with a low coercive force and a perpendicularly magnetized layer were substantially free from curling.

Each of the magnetic recording media obtained was slit to a width of ¼ inch to form a tape. The tape was subjected to recording and playback at a speed of 9.5 cm/sec. using a ring head having a gap length of 0.3 μm, and its electromagnetic converting characteristics (digital recording density characteristics) were evaluated. Specifically, the high-density recording characteristics, especially the noise level, of the tape were evaluated by measuring the S/N ratio (dB) during recording and playback of 10 KBPI and the decrease ratio (dB) of the output during recording and playback of 50 KBPI based on the output during recording and playback of 10 KBPI.

The results show that while the decrease ratio of the playback output was large and the noise level was inferior in Comparative Examples 1 to 3, the magnetic recording media of the invention obtained in Examples 1 to 4 had a high S/N ratio (dB) and a much better noise level.

TABLE 1

|  |  | Example | | | | Comparative Example | | |
|---|---|---|---|---|---|---|---|---|
|  |  | 1 | 2 | 3 | 4 | 1 | 2 | 3 |
| Conditions for preparing the stabilize* | Temperature (°C.) | 135 | 140 | 145 | 140 | — | — | — |
|  | (P)/(KOH) | 0.67 | 0.61 | 0.56 | 0.61 | — | — | — |
| Inert inorganic compound added | Name | — | — | — | Calcium phosphate | — | Calcium phosphate | Kaolin |
|  | Particle size distribution (%) 1.5 ≧ d > 0.5 | — | — | — | 3.0 | — | 0 | 4.8 |
|  | 0.5 ≧ d > 0.2 | — | — | — | 33.7 | — | 33.7 | 43.6 |
|  | 0.2 ≧ d | — | — | — | 63.3 | — | 63.3 | 51.6 |
|  | Amount (wt. %) | — | — | — | 0.5 | — | 0.5 | 0.5 |
| Properties of the film surface | CLA (μm) | 0.0050 | 0.0036 | 0.0045 | 0.0045 | 0.007 | 0.009 | 0.015 |
|  | PV (μm) | 0.05 | 0.04 | 0.06 | 0.060 | 0.20 | 0.32 | 0.43 |
|  | Number of 0.27-0.54 μm protrusions | 0.20 | 0 | 0.13 | 0.17 | 0.70 | 0.87 | 13.0 |
|  | Number of >0.54 μm protrusions | 0 | 0 | 0 | 0 | 0.03 | 0.04 | 0.65 |
| S/N (dB) (10 KBPI) |  | 44 | 49 | 47 | 44 | 37 | 36 | 28 |

TABLE 1-continued

|  | Example | | | | Comparative Example | | |
|---|---|---|---|---|---|---|---|
|  | 1 | 2 | 3 | 4 | 1 | 2 | 3 |
| $\frac{S(10\ KBPI)}{S(50\ KBPI)}$ (dB) | 5 | 3 | 4 | 5 | 9 | 10 | 17 |

*Trimethyl phosphate (25 parts) and 75 parts of ethylene glycol were reacted under reflux for 5 hours in a closed system.

EXAMPLES 5 TO 8 AND COMPARATIVE EXAMPLES 4 TO 6

In Examples 5 to 8, the same oriented polyethylene terephthalate films as in Examples 1 to 4 were used as a support, and in Comparative Examples 4 to 6, the same oriented films as in Comparative Examples 1 to 3 were used as a support.

Using an electron beam heat evaporating device, a magnetic recording layer was formed on each of the film supports by depositing a Cr layer having a thickness of 0.1 μm on the film at a depositing speed of 200 Å/min. under a vacuum of 1×10⁻⁶, and obliquely depositing a vapor of Co-Cr alloy (Cr 10% by weight) on the Cr layer at a speed of 80 Å/min. at an angle of 70° to the perpendicular to the film surface. The resulting Co-Cr magnetic layer had a saturation magnetization of about 700 emu/cc, a coercive force in the machine direction of 600 to 650 oersteds and a squareness ratio of about 0.95.

The film having the recording layer so formed was slit to a width of ½ inch, and its frequency characteristics and noise level were measured by using a commercial rotary head-type VTR device. Recording and playback were carried out while maintaining the gap length of the magnetic head at 0.3 μm, the relative speed of the tape and the head at 3 m/sec.

As standards of evaluation, the S/N (dB) with a recording signal of 1 MH$_z$ and the decrease ratio (dB) of the playback output at 5 MH$_z$ (recording wavelength 0.6 μm) based on the playback output at 1 MH$_z$ were measured. The results are shown in Table 2.

TABLE 2

|  | Example | | | | Comparative Example | | |
|---|---|---|---|---|---|---|---|
|  | 5 | 6 | 7 | 8 | 4 | 5 | 6 |
| S/N (dB) (1 MHz) | 65 | 70 | 68 | 65 | 52 | 53 | 38 |
| $\frac{S(1\ MHz)}{S(5\ MHz)}$ (dB) | 5 | 3 | 4 | 5 | 9 | 10 | 14 |

The results show that while in Comparative Examples 4 to 6, the decrease ratio of the playback output was large and the noise level was inferior, the magnetic recording media of the invention obtained in Examples 5 to 8 had a high S/N (dB) ratio and a much better noise level.

EXAMPLES 9 TO 11 AND COMPARATIVE EXAMPLES 7 TO 8

One hundred parts of dimethyl terephthalate and 70 parts of ethylene glycol were subjected to an ester-interchange reaction in the presence of 0.023 part (0.020 mole% of the dimethyl terephthalate) of zinc acetate as a catalyst at 150° to 240° C. for 4 hours while distilling off methanol.

Each of the stabilizers (glycol solutions of phosphorus compounds) prepared by the methods shown in Table 3 was cooled to room temperature, and added in an amount of 0.014 part calculated as trimethyl phosphate. As a polycondensation catalyst, 0.04 part of antimony trioxide was added, and the ester-interchange reaction product was polycondensed for 4 hours under a high vacuum of less than 1 mmHg to give polyethylene terephthalate. The resulting polyethylene terephthalate chips were dried at 170° C. for 3 hours, and melt-extruded under the conditions shown in Table 3 to give an unstretched film having a thickness of 140 μm.

The film was stretched at 90° C. and a stretch ratio of 3.6 in the longitudinal direction, then stretched at 100° C. and a stretch ratio of 3.9 in the transverse direction, and heat-set at 210° C. for 10 seconds to give an oriented polyethylene terephthalate film having a thickness of 10 μm. The surface properties of the resulting film are shown in Table 3.

Then, in order to improve the handlability of the film, one surface of the resulting film was coated with a 2% by weight aqueous solution of a composition consisting of 45 parts of epoxy-modified silane, 40 parts of aminosilane, 5 parts of MoS$_2$ and 10 parts of a surface-active agent, and then the film was heat-set.

An Mo-permalloy layer having a low coercive force was formed on the uncoated surface of the film, and a Co-Cr perpendicularly magnetized film layer was formed on the permalloy layer, by the same methods as in Examples 1 to 4 and Comparative Examples 1 to 3.

The resulting recording media having the layer with a low coercive force and the perpendicularly magnetized layer were substantially free from curling.

The electromagnetic converting characteristics of the resulting magnetic recording media were measured in the same way as in Examples 1 to 4 and Comparative Examples 1 to 3, and the results are shown in Table 3.

It is seen from Table 3 that the magnetic recording media obtained by using the oriented polyethylene terephthalate films prepared in Examples 9 to 11 had a high S/N (dB) ratio and a much better noise level.

TABLE 3

|  |  | Example | | | Comparative Example | |
|---|---|---|---|---|---|---|
|  |  | 9 | 10 | 11 | 7 | 8 |
| Conditions for preparing the stabilize* | Temperature (°C.) | 135 | 140 | 145 | 130 | 150 |
|  | $\frac{(P)}{(KOH)}$ | 0.67 | 0.61 | 0.56 | 0.51 | 0.73 |
| Extruding | Resin | 285 | 290 | 310 | 290 | 290 |

TABLE 3-continued

| | | Example | | | Comparative Example | |
|---|---|---|---|---|---|---|
| | | 9 | 10 | 11 | 7 | 8 |
| conditions | temperature (°C.) | | | | | |
| | Time of residence in the extruder (minutes) | 4 | 7 | 15 | 8 | 10 |
| Properties of the film surface | CLA (μm) | 0.0049 | 0.0035 | 0.0044 | 0.012 | 0.011 |
| | PV (μm) | 0.050 | 0.035 | 0.043 | 0.40 | 0.38 |
| | Number of 0.27-0.54 μm protrusions | 0.20 | 0 | 0.13 | 5.87 | 4.07 |
| | Number of >0.54 μm protrusions | 0 | 0 | 0 | 0.29 | 0.16 |
| S/N (dB) (10 KBPI) | | 44 | 49 | 47 | 36 | 37 |
| $\frac{S(10\ KBPI)}{S(50\ KBPI)}$ (dB) | | 5 | 3 | 4 | 10 | 9 |

*Same as the footnote to Table 1.

EXAMPLES 12 TO 14 AND COMPARATIVE EXAMPLES 9 AND 10

A recording layer was formed in the same way as in Examples 5 to 8 and Comparative Examples 4 to 6 on the same oriented films as used in Examples 9 to 11 (Examples 12 to 14), or the same oriented films as used in Comparative Examples 7 and 8 (Comparative Examples 9 and 10).

Specifically, by using an electron beam heat evaporation device, Cr was deposited to a thickness of 0.1 μm on the film at a depositing speed of 200 Å/sec. under a vacuum of $1 \times 10^{-6}$ torr, and Co-Cr alloy (Cr 10% by weight) was obliquely deposited on the Cr layer to a thickness of 0.15 μm at a depositing speed of 80 Å/sec. at an angle of 70° to the perpendicular to the film surface.

The resulting Co-Cr magnetic layer had a saturation magnetization of about 700 emu/cc, a coercive force in the machine direction of 600 to 650 oersteds, and a squareness ratio of about 0.95.

The film having the recording layer so formed was slit to a width of ½ inch, and its frequency characteristics and noise level were measured by a commercial rotary head-type VTR device in the same way as in Examples 5 to 8 and Comparative Examples 4 to 6. The results are shown in Table 4.

TABLE 4

| | Example | | | Comparative Example | |
|---|---|---|---|---|---|
| | 12 | 13 | 14 | 9 | 10 |
| S/N (dB) (1 MHz) | 65 | 70 | 68 | 49 | 52 |
| $\frac{S(1\ MHz)}{S(5\ MHz)}$ (dB) | 5 | 3 | 4 | 11 | 9 |

It is seen from Table 4 that the magnetic recording media prepared by using the oriented polyethylene terephthalate films of this invention (Examples 12 to 14) had a high S/N ratio and a much better noise level.

EXAMPLES 15 TO 17 AND COMPARATIVE EXAMPLES 11 TO 13

In these examples, a polyethylene terephthalate film support was produced by laminating a film providing surface A and a film providing surface B by a co-extrusion method.

One hundred parts of dimethyl terephthalate and 70 parts of ethylene glycol were subjected to an ester-interchange reaction in the presence of 0.023 part (0.020 mole% based on dimethyl terephthalate of zinc acetate at 150° to 240° C. for 4 hours while distilling off methanol. Then, a stabilizer (a glycol solution of a phosphorus compound) was prepared, cooled to room temperature and added in an amount of 0.014 part calculated as trimethyl phosphate. Then, 0.04 part of antimony trioxide was added as a polycondensation catalyst, and further, a predetermined amount of each of the inert inorganic compounds having the particle size distribution shown in column I of Table 5 was added. The ester-interchange reaction product was thus polycondensed for 4 hours under a high vacuum of less than 1 mmHg to give a polyethylene terephthalate composition I having an [η], measured at 25° C. in o-chlorophenol, of 0.65 (a material for a film providing surface A).

Separately, a polyethylene terephthalate composition II (a material for a film providing surface B) having an [η] of 0.65 was prepared by performing the same polycondensation reaction as in the preparation of the polyethylene terephthalate composition I above except that a predetermined amount of each of the inert inorganic compounds having the particle size distributions shown in column II of Table 5 was added.

The compositions I and II were co-extruded so that the ratio of the thickness of the former to that of the latter was 1:1. Thus, an unstretched film having a thickness of 210 μm was prepared. The unstretched film was stretched first in the longitudinal direction at 90° C. and a stretch ratio of 3.5, and then in the transverse direction at 100° C. and a stretch ratio of 4.0. The biaxially stretched film was heat-set at 205° C. for 30 seconds to produce a film having a thickness of 15 μm.

Before the above heat-setting operation, the surface B of the oriented film (except Comparative Example 13) was coated with a lubricant solution consisting of 12 kg of a 2% by weight solution of aluminum acrylate (P-3 ®, a product of Asada Chemical K.K.), 5 kg of a 2% by weight solution of polyethylene glycol having a molecular weight of 19,000 (a product of Nippon Oils and Fats Co., Ltd.), 2 kg of a 2% by weight solution of polyethylene glycol diglycidyl ether (NEROIO ®, a product of Nagase Sangyo Co., Ltd.) and 1 kg of a 2% by weight solution of polyoxyethylene nonyl phenyl ether. The amount of the lubricant applied was about 2.2 g/m² in the wet state (about 0.0126 g/m² as solids).

The slippability of the resulting film was good and no blocking occurred. It could be wound up in good condition.

In the same way as in Examples 1 to 4 and Comparative Examples 1 to 3, an Mo-permalloy layer having a low coercive force and a Co-Cr perpendicularly magnetized layer were formed on the surface A of the resulting film. The resulting recording medium having the layer with a low coercive force and the perpendicularly magnetized layer was substantially free from curling.

The properties of the resulting magnetic recording media were measured in the same way as in Examples 1 to 4 and Comparative Examples 1 to 3. The results are shown in Table 5.

It is seen from the results shown in Table 5 that the magnetic recording media obtained in Examples 15 to 17 had a high S/N ratio (dB) and a much better noise level.

room temperature, and added to the ester-interchange reaction product in an amount of 0.014 part calculated as trimethyl phosphate, and then 0.04 parts of antimony trioxide was added as a polymerization catalyst. The ester-interchange reaction product was thus polycondensed for 4 hours under a high vacuum of less than 1 mmHg to give polyethylene terephthalate chips.

The polyethylene terephthalate chips were dried at 170° C. for 3 hours, and then melt-extruded by an extruder with a residence time of 7 minutes to form an unstretched film having a thickness of 140 μm.

The unstretched film was stretched longitudinally at 90° C. and a stretch ratio of 3.6, then transversely at 100° C. and a stretch ratio of 3.9, and heat-set at 210° C. for 10 seconds to give an oriented polyethylene terephthalate film having a thickness of 10 μm.

To improve the handling property of this film, its one side was coated with a 2% by weight aqueous solution

TABLE 5

| | | | Example Composition | | | | | |
|---|---|---|---|---|---|---|---|---|
| | | | 15 | | 16 | | 17 | |
| | | | I | II | I | II | I | II |
| Inert inorganic compound added | Name | | — | Kaolin | Calcium phosphate | Calcium phosphate | Kaolin | — |
| | Particle size distribution (%) | $1.5 \geq d > 0.5$ | — | 4.8 | 3.0 | 3.0 | 3.2 | — |
| | | $0.5 \geq d > 0.2$ | — | 43.6 | 33.7 | 33.7 | 35.1 | — |
| | | $0.2 \geq d$ | — | 51.6 | 63.3 | 63.3 | 61.7 | — |
| | Amount (wt. %) | | — | 0.5 | 0.5 | 0.1 | 0.3 | — |
| Properties of the film surface | CLA (μm) | | 0.0036 | 0.015 | 0.0045 | 0.0039 | 0.008 | 0.0036 |
| | PV (μm) | | 0.02 | 0.20 | 0.04 | 0.03 | 0.06 | 0.02 |
| | Number of 0.27–0.54 μm protrusions | | 0 | 13.0 | 0.17 | 0.04 | 0.20 | 0 |
| | Number of >0.54 μm protrusions | | 0 | 0.45 | 0 | 0 | 0 | 0 |
| S/N (dB) (10 KBPI) | | | 49 | — | 44 | — | 42 | — |
| $\frac{S(10\ KBPI)}{S(50\ KBPI)}$ (dB) | | | 3 | — | 5 | — | 6 | — |

| | | | Comparative Example Composition | | | | | |
|---|---|---|---|---|---|---|---|---|
| | | | 11 | | 12 | | 13 | |
| | | | I | II | I | II | I | II |
| Inert inorganic compound added | Name | | Clay | — | Kaolin | — | Kaolin | Clay |
| | Particle size distribution (%) | $1.5 \geq d > 0.5$ | 12.1 | — | 4.8 | — | 23.2 | 12.1 |
| | | $0.5 \geq d > 0.2$ | 59.9 | — | 43.6 | — | 65.9 | 59.9 |
| | | $0.2 \geq d$ | 28.0 | — | 51.6 | — | 10.9 | 28.0 |
| | Amount (wt. %) | | 0.10 | — | 0.5 | — | 0.52 | 0.1 |
| Properties of the film surface | CLA (μm) | | 0.010 | 0.035 | 0.015 | 0.036 | 0.017 | 0.011 |
| | PV (μm) | | 0.38 | 0.02 | 0.21 | 0.02 | 0.45 | 0.40 |
| | Number of 0.27–0.54 μm protrusions | | 5.0 | 0 | 13.0 | 0 | 21.8 | 5.5 |
| | Number of >0.54 μm protrusions | | 0.17 | 0 | 0.60 | 0 | 1.10 | 0.028 |
| S/N (dB) (10 KBPI) | | | 38 | — | 28 | — | 25 | — |
| $\frac{S(10\ KBPI)}{S(50\ KBPI)}$ (dB) | | | 9 | — | 17 | — | 20 | — |

EXAMPLE 18

[Run A]

One hundred parts of dimethyl terephthalate and 70 parts of ethylene glycol were subjected to an ester-interchange reaction in the presence of 0.023 part of zinc acetate as a catalyst at 150° to 240° C. while distilling off methanol.

Trimethyl phosphate (25 parts) and 75 parts of ethylene glycol were reacted under reflux at 140° C. for 5 hours in a closed system. The product was cooled to room temperature, and added to the ester-interchange of a composition consisting of 45 parts by weight of epoxy-modified silane, 40 parts by weight of aminosilane, 5 parts by weight of $MoS_2$ and 10 parts by weight of a surface-active agent. The film was then slit to a width of 100 mm and a length of 100 m.

The film formation and slitting were carried out in an atmosphere rated as class 10,000 on the clean room scale.

[Run B]

The same procedure as in Run A was carried out except that the film formation and slitting were performed in an atmosphere rated as class 100 on the clean room scale.

[Run C]

The film formation and slitting were carried out in an atmosphere rated as class 10,000 on the clean room scale as in Run A. In this Run, in a first wind-up step in the film formation and a second wind-up step in the film slitting, static charges were eliminated by blowing ionized air against the film, and simultaneously, the dust adhering to the film was removed by impinging air ionized by ultrasonic waves against the film surface while blowing high-speed air and performing vacuum sucking.

[Run D]

A slit film was produced in the same way as in Run C except that the atmosphere in the film formation and slitting was changed to that rated as class 100 on the clean room scale.

[Run E]

A slit film was produced in the same way as in Run A except that no measure was taken against static charge build-up and dust adhesion, and the film formation and slitting were carried out in an atmosphere rated as class 100,000 on the clean room scale.

On each of the slit films obtained in the above Runs A to E, Co-Ni alloy (Ni 18%) was obliquely deposited to a thickness of 0.10 μm at a depositing speed of 80 Å/sec. at an angle of 70° to the perpendicular to the surface of the film under a vacuum of $1 \times 10^{-6}$ torr by using an electron beam heat evaporation device.

The resulting Co-Ni layer had a saturation magnetization of about 700 emu/cc, a coercive force in the machine direction of 600 to 650 oersteds and a squareness ratio of about 0.95.

The slit films having the recording layer were each slit further to a width of ½ inch, and their frequency characteristics and noise levels were measured by using a commercial rotary heat-type VTR device. The recording and playback were carried out while maintaining the gap length of the magnetic head at 0.2 μm, and the relative speed of the tape and the head at 3.7 m/sec.

As evaluation standards, the S/N (dB) ratio at a recording signal of 1 MHz, and the ratio of the playback output at 1 MHz to that at 4.6 MHz (central recording wavelength 0.8 μm) were determined. The results are shown in Table 6.

The number of dropouts per minute at 15 μS-20 dB and 40 μS-20 dB are also shown in Table 6. The number of dropouts per minute was determined from the recording area per minute (=video track width tape running speed=4 mm × 14.3 mm/sec. × 60S).

TABLE 6

| | | Run | | | | |
|---|---|---|---|---|---|---|
| | | A | B | C | D | E |
| S/N (dB) (1 MHz) | | 70 | 75 | 72 | 77 | 60 |
| $\frac{S(1\ MHz)}{S(4.6\ MHz)}$ (dB) | | 4 | 3 | 4 | 2 | 7 |
| Number of dropouts per minute | 40 μS-20 dB | 31 | 11 | 26 | 7 | 350 |
| | 15 μS-20 dB | 83 | 26 | 75 | 20 | 1300 |

It is seen from Table 6 that the magnetic tapes produced by using the polyester films produced in an atmosphere having a much reduced dust content had a high S/N ratio, and much improved noise levels and dropout numbers.

What we claim is:

1. A magnetic recording medium composed of an oriented polyethylene terephthalate film as a support layer and a thin magnetic metallic layer formed on one surface (A) of the support layer and optionally a lubricant layer formed on the other surface (B) of the support layer; characterized in that
   (1) the surface A has a center-line average (CLA) of not more than 0.005 μm,
   (2) the surface A has a peak-to-valley (PV) value of not more than 0.06 μm,
   (3) the number of protrusions having a height of 0.27 to 0.54 μm on the surface A is at most 0.2 per mm², and
   (4) the surface A is substantially free from protrusions having a height larger than 0.54 μm,
   and wherein the oriented polyethylene terephthalate film support layer is produced by subjecting a lower alkyl ester of a dicarboxylic acid comprising terephthalic acid as a main component and a glycol comprising ethylene glycol as a main component to an ester-interchange reaction in the presence of, as a catalyst, a compound of at least one metal selected from Mn, Zn, Ca and Mg using a glycol solution of a trialkyl phosphate as a stabilizer wherein the concentration of phosphorus in the glycol solution is such that the amount of potassium hydroxide required to titrate the solution to a pH of 9.5 is expressed by the following formula:

$$0.53 \leq \frac{(P)}{(KOH)} \leq 0.71 \quad (I)$$

wherein (P) is the amount (moles) of phosphorus in the glycol solution titrated, and (KOH) is the amount (moles) of potassium hydroxide required to the titration,
polycondensing the ester-interchange reaction product, extruding the resultant polyethylene terephthalate, stretching the resulting film, and heat-setting the stretched film.

2. The magnetic recording medium of claim 1 wherein the surface A has a center-line average (CLA) of not more than 0.004 μm.

3. The magnetic recording medium of claim 1 wherein the surface A is substantially free from protrusions having a height larger than 0.27 μm.

4. The magnetic recording medium of claim 1 wherein the thin magnetic metal layer is formed by vacuum evaporation, sputtering, ion plating or electroless plating, and has a thickness of 0.02 to 1.5 μm.

* * * * *